US012684406B2

(12) United States Patent
Li

(10) Patent No.: US 12,684,406 B2
(45) Date of Patent: Jul. 14, 2026

(54) TRAFFIC PATTERN HANDLING

(71) Applicant: ZTE Corporation, Shenzhen (CN)

(72) Inventor: Zhendong Li, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 431 days.

(21) Appl. No.: 18/155,950

(22) Filed: Jan. 18, 2023

(65) Prior Publication Data

US 2023/0156517 A1 May 18, 2023

Related U.S. Application Data

(63) Continuation of application No. PCT/CN2020/103245, filed on Jul. 21, 2020.

(51) Int. Cl.
H04W 28/02 (2009.01)
H04L 47/283 (2022.01)

(52) U.S. Cl.
CPC ....... H04W 28/0268 (2013.01); H04L 47/283 (2013.01)

(58) Field of Classification Search
CPC   H04W 28/0268; H04W 28/02; H04L 47/283; H04L 47/24; H04L 47/28; H04L 41/0894; H04L 41/12; H04L 41/5009
See application file for complete search history.

(56) References Cited

U.S. PATENT DOCUMENTS

| | | | |
|---|---|---|---|
| 11,894,937 B2 * | 2/2024 | Thiebaut | H04W 4/24 |
| 12,010,002 B2 * | 6/2024 | Espinosa Santos ... | H04L 43/028 |
| 2020/0137615 A1 | 4/2020 | Joseph et al. | |
| 2020/0383151 A1 * | 12/2020 | Wang | H04W 36/0066 |
| 2021/0329485 A1 * | 10/2021 | Han | H04W 28/0858 |
| 2021/0344735 A1 * | 11/2021 | Ke | H04L 47/2491 |
| 2022/0014296 A1 * | 1/2022 | Wang | H04J 3/0682 |
| 2022/0030641 A1 * | 1/2022 | Wang | H04W 40/02 |
| 2022/0109633 A1 * | 4/2022 | Li | H04W 48/08 |

(Continued)

FOREIGN PATENT DOCUMENTS

| | | |
|---|---|---|
| CN | 110213007 A | 9/2019 |
| CN | 110535552 A | 12/2019 |
| CN | 110611924 A | 12/2019 |

(Continued)

OTHER PUBLICATIONS

3GPP TS 23.501 v16.5.0 Dated Jul. 9, 2020 (Year: 2020).*

(Continued)

*Primary Examiner* — Nizar N Sivji
(74) *Attorney, Agent, or Firm* — Perkins Coie

(57) ABSTRACT

The present application relates to methods, systems, and devices related to digital wireless communication, and more specifically, to techniques related to traffic pattern handling. In one exemplary aspect, a method for wireless communication is described. The method includes transmitting, by a first network function, a first message to a second network function that includes information relating to a stream of data, wherein the second network function is configured to derive a traffic pattern based on the information relating to the stream of data included in the first message. The method can also include receiving, by the first network function, a second message from the second network function that includes the derived traffic pattern.

18 Claims, 13 Drawing Sheets

(56) References Cited

U.S. PATENT DOCUMENTS

| | | | | |
|---|---|---|---|---|
| 2023/0019215 A1* | 1/2023 | Wang | ............... | H04L 47/24 |
| 2023/0132058 A1* | 4/2023 | Youn | ............... | H04W 4/24 |
| | | | | 370/329 |

FOREIGN PATENT DOCUMENTS

| | | |
|---|---|---|
| CN | 110809295 A | 2/2020 |
| CN | 111083690 A | 4/2020 |
| WO | 2018174383 A1 | 9/2018 |

OTHER PUBLICATIONS

SA WG2 Meeting #136-AH S2-2001414 Jan. 13-17, 2020 Incheon KR (Year: 2020).*

SA WG2 Meeting #S2-136AH S2-2000555 Jan. 13-17, 2020 Incheon, South Korea (Year: 2020).*

TS23.502 Sec 4.4.1 N4 Session Management procedure (Year: 2011).*

Ericsson, "Change Request: Additional traffic pattern calculations," SA WG2 Meeting #S2-136AH, S2-2000555, Jan. 13-17, 2020, Incheon, South Korea (6 pages).

Nokia et al., "TSN—Exposure QoS," SA WG2 Meeting #136-AH, S2-2001414, Jan. 13-17, 2020, Incheon , KR (3 pages).

Extended European Search Report for European Patent Application No. 20945848.8, mailed Jul. 14, 2023 (9 pages).

Office Action for Chinese Patent Application No. 202080104653.8, mailed Jan. 18, 2025 (11 pages).

Office Action for Korean Patent Application No. 10-2023-7002196, mailed Feb. 14, 2025 (12 pages).

First Examination Report for Indian Patent Application No. 202317002956, mailed May 22, 2024 (5 pages).

Office Action for Chinese Patent Application No. 202080104653.8, mailed Jul. 25, 2024 (16 pages).

3GPP, "System architecture for the 5G System (5GS)," 3GPP TS 23.501 V16.5.0, Jul. 2020.

International Search Report and Written Opinion for International Application No. PCT/CN2020/103245, mailed on Apr. 26, 2021 (9 pages).

CNIPA, Rejection Decision for Chinese Application No. 2020801046538, mailed on Mar. 24, 2025, 12 pages with unofficial English translation.

Communication pursuant to Article 94(3) EPC for European Patent Application No. 20 945 848.8, mailed Aug. 8, 2025, (6 pages).

Third Office Action for Chinese Patent Application No. 202080104653. 8, mailed Oct. 17, 2025 with Search Report in English (7 pages).

Ericsson, "TSCAI arrival time analysis," 3GPP TSG-SA WG2 Meeting #133 Reno, USA, May 13-May 17, 2019, S2-1904935 (4 pages).

ZTE, "Alignment on Identifying PDU session in TSN AF," SA WG2 Meeting #S2-138E, Apr. 20-24, 2020, Electronic, Elbonia, S2-2003031 (4 pages).

Office Action for Korean Patent Application No. 10-2023-7002196, mailed Oct. 29, 2025 with English summary (8 pages).

\* cited by examiner

1100

TRANSMIT A FIRST MESSAGE TO A SECOND
NETWORK FUNCTION THAT INCLUDES
INFORMATION RELATING TO A STREAM OF
DATA — 1102

RECEIVE A SECOND MESSAGE FROM THE
SECOND NETWORK FUNCTION THAT INCLUDES
THE DERIVED TRAFFIC PATTERN — 1104

TRAFFIC PATTERN HANDLING

CROSS REFERENCE TO RELATED APPLICATIONS

This patent document is a continuation of and claims benefit of priority to International Patent Application No. PCT/CN2020/103245, filed on Jul. 21, 2020. The entire content of the before-mentioned patent application is incorporated by reference as part of the disclosure of this application.

TECHNICAL FIELD

This patent document is directed generally to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, are being discussed.

SUMMARY

This document discloses methods, systems, and devices related to digital wireless communication, and more specifically, to techniques related to traffic pattern handling.

In one exemplary aspect, a method for wireless communication is disclosed. The method includes transmitting, by a first network function, a first message to a second network function that includes information relating to a stream of data, wherein the second network function is configured to derive a traffic pattern based on the information relating to the stream of data included in the first message. The method can also include receiving, by the first network function, a second message from the second network function that includes the derived traffic pattern.

In another exemplary embodiment, a method for data communication includes receiving, by a user plane function, a first message from a session management function that includes information relating to a stream of data. The method also includes calculating, by the user plane function, a traffic pattern based on the information relating to the stream of data included in the first message. The method also includes transmitting, by the user plane function, a second message to the session management function that includes the calculated traffic pattern.

In another exemplary embodiment, a method of data communication comprises receiving, by a terminal, a first message from a first network function that includes information relating to a stream of data. The method also includes calculating, by the terminal, a traffic pattern based on the information relating to the stream of data included in the first message. The method also includes transmitting, by the terminal, a second message to the first network function that includes the calculated traffic pattern.

In another exemplary aspect, a wireless communications apparatus comprising a processor is disclosed. The processor is configured to implement a method described herein.

In yet another exemplary aspect, the various techniques described herein may be embodied as processor-executable code and stored on a computer-readable program medium.

The details of one or more implementations are set forth in the accompanying attachments, the drawings, and the description below. Other features will be apparent from the description and drawings, and from the clauses.

DETAILED DESCRIPTION

The development of the new generation of wireless communication—5G New Radio (NR) communication—is a part of a continuous mobile broadband evolution process to meet the requirements of increasing network demand. NR will provide greater throughput to allow more users connected at the same time. Other aspects, such as energy consumption, device cost, spectral efficiency, and latency are also important to meeting the needs of various communication scenarios.

In the many cases, a 5G system can support the Institute of Electrical and Electronics Engineers (IEEE) time sensitive network (TSN) traffic. Examples of such traffic include gaming data where low delay is critical, two-way audio or video conversations, and so on. Many 5G networks (e.g., a 5GS network) may be enhanced to be as a TSN virtual bridge (e.g., from a TSN network perspective, the 5GS appears as a TSN bridge entity.

Figure 1:
FIG. 1 is an example block diagram of a 5GS acting as a TSN bridge.
Figure 1:
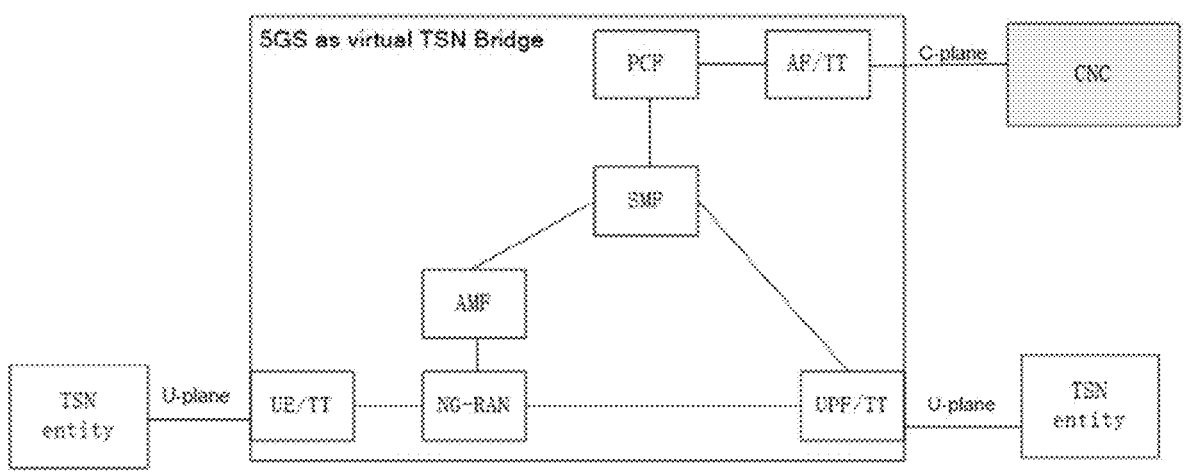

FIG. 1 is an example block diagram 100 of a 5GS acting as a TSN bridge. The 5GS can support strict periodicity traffic of TSN in many cases. This traffic may have explicit periodicity characteristics (e.g., burst arrival time, size, and periodicity) associated with the traffic.

However, many existing networks/applications may not deploy the TSN. Therefore, currently, it is not known how to support the deterministic feature of time sensitive traffic while there is no TSN deployed.

Figure 2:
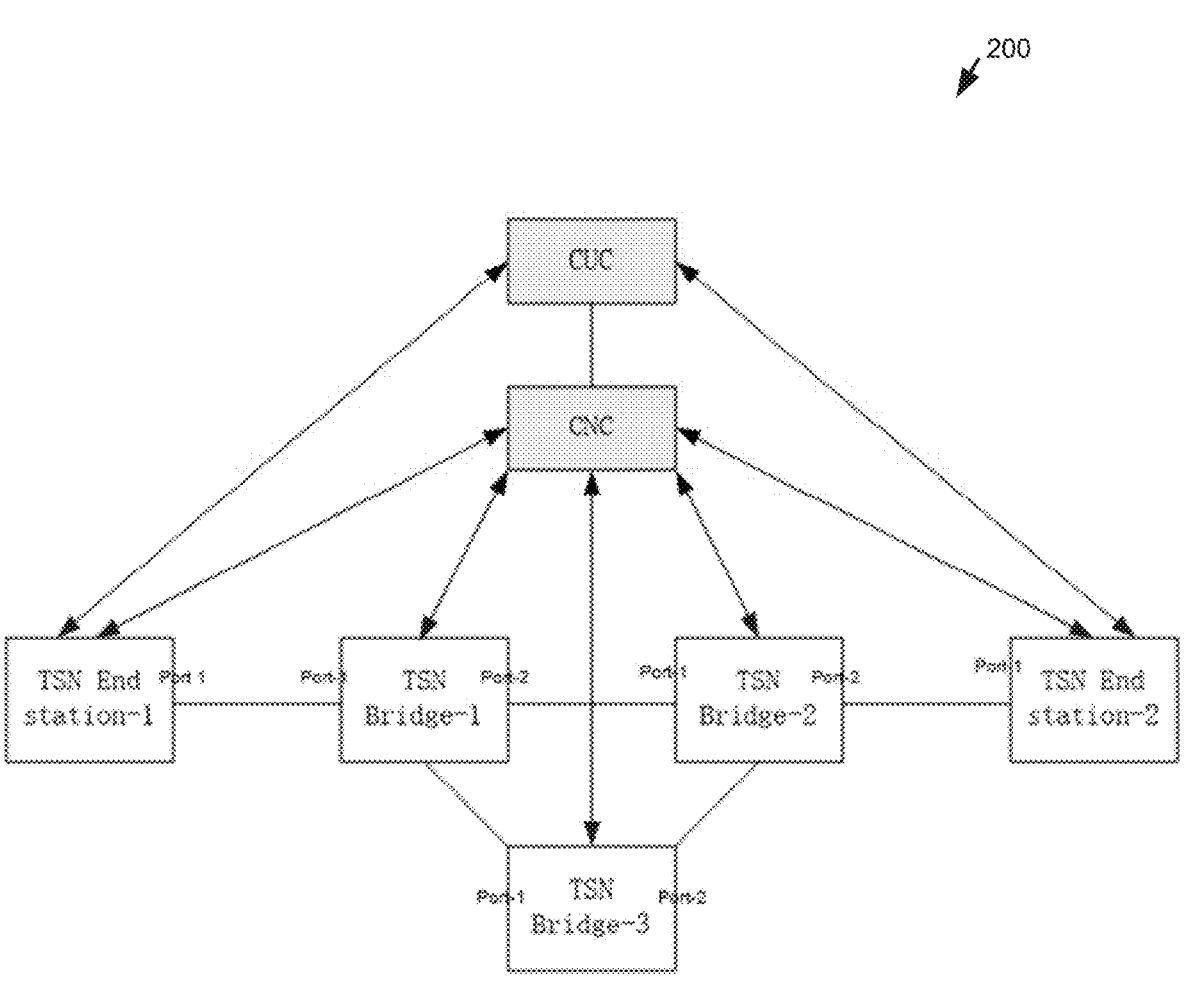
FIG. 2 illustrates an example block diagram of a full centralized mode TSN network.

In many cases, only a full centralized mode of TSN is supported. FIG. 2 illustrates an example block diagram 200 of a full centralized mode TSN network. There may be Centralized user controller (CUC) and Centralized network controller (CNC) except the TSN end station and TSN Bridge. The CNC in the TSN network can control/configure all the TSN entity within the TSN network. The CUC can communicate the TSN end station for TSN application service information and send stream configuration information to CNC. All the nodes (TSN end station and TSN bridge) in this TSN network can report its capability and neighborhood topology to the CNC. After getting such information, the CNC can construct the whole TSN network topology (topology discovery) and capability.

Figure 3:
FIG. 3 is an example block diagram of an example fully centralized mode TSN network model.
Figure 3:
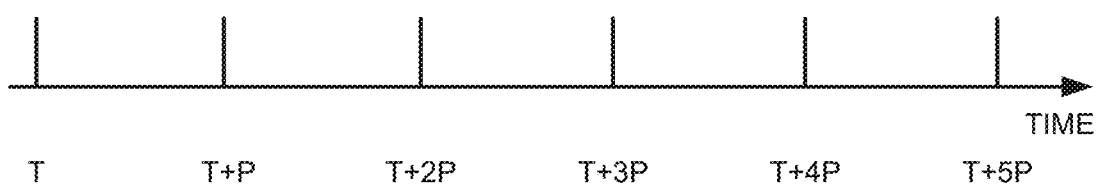

FIG. 3 is an example block diagram 300 of an example fully centralized mode TSN network model. According to stream configuration information from CUC, the CNC can decide whether a TSN stream is to be established. The CNC can calculate an End to End path for the stream according to the stream Sender (or Talker in TSN), stream Receiver (or listener in TSN), TSN entity capability, link capability, and TSN network topology.

After calculating the path, the CNC may configure TSN Bridge with any of a forwarding rule, a stream information in the ingress port (e.g., Per stream Forwarding and Policing (PSPF), e.g. packet arrival time, stream identification), a scheduling schema in the egress port, etc.

Upon configuration of the TSN bridge, when the data frame/packet arrive the bridge, the bridge may know how to handle, e.g., at what time and in which port to forward the received frame in order to ensure compliance with the forwarding rule.

Further, because the 5GS may be simulated as a TSN bridge, it may also receive the configuration from CNC. The configuration information can include any of: Admin Base-Time indicating when the first packet of steam arrives the Bridge (e.g., 5GS) and Admin CycleTime indicating the periodicity of the stream packet, and so on.

For example, the Admin BaseTime is T, and Admin CycleTime is P. From the perspective of 5G system, the packet arrival time sequence to 5GS ingress (i.e. UPF for DL traffic, and UE/DS-TT for the UL traffic) is shown in FIG. 3.

The TSN AF may set TSN QoS Burst Arrival Time as Admin BaseTime, and TSN QoS Periodicity as Admin CycleTime. TSN AF can send both parameters to SMF.

The SMF can use TSN information from TSN AF to derive the TSC Assistance Information (TASCI) corresponding to the Qos flow which can carry the TSN stream and send to NG-RAN.

There may be three Information Elements (IEs) in the TSCAI. An example is shown in Table 1.

Time and CN PDB (core network packet delay budget, i.e. the delay between UPF and NG-RAN), the SMF setting the UL TSCAI Burst Arrival Time as the sum of TSN QoS Burst Arrival Time and UE-DS-TT Residence Time, the SMF setting the Periodicity as the TSN QoS Periodicity, etc. When the NG-RAN receives such information, the NG-RAN can perform access control and radio resource reservation in advance.

Figure 4:
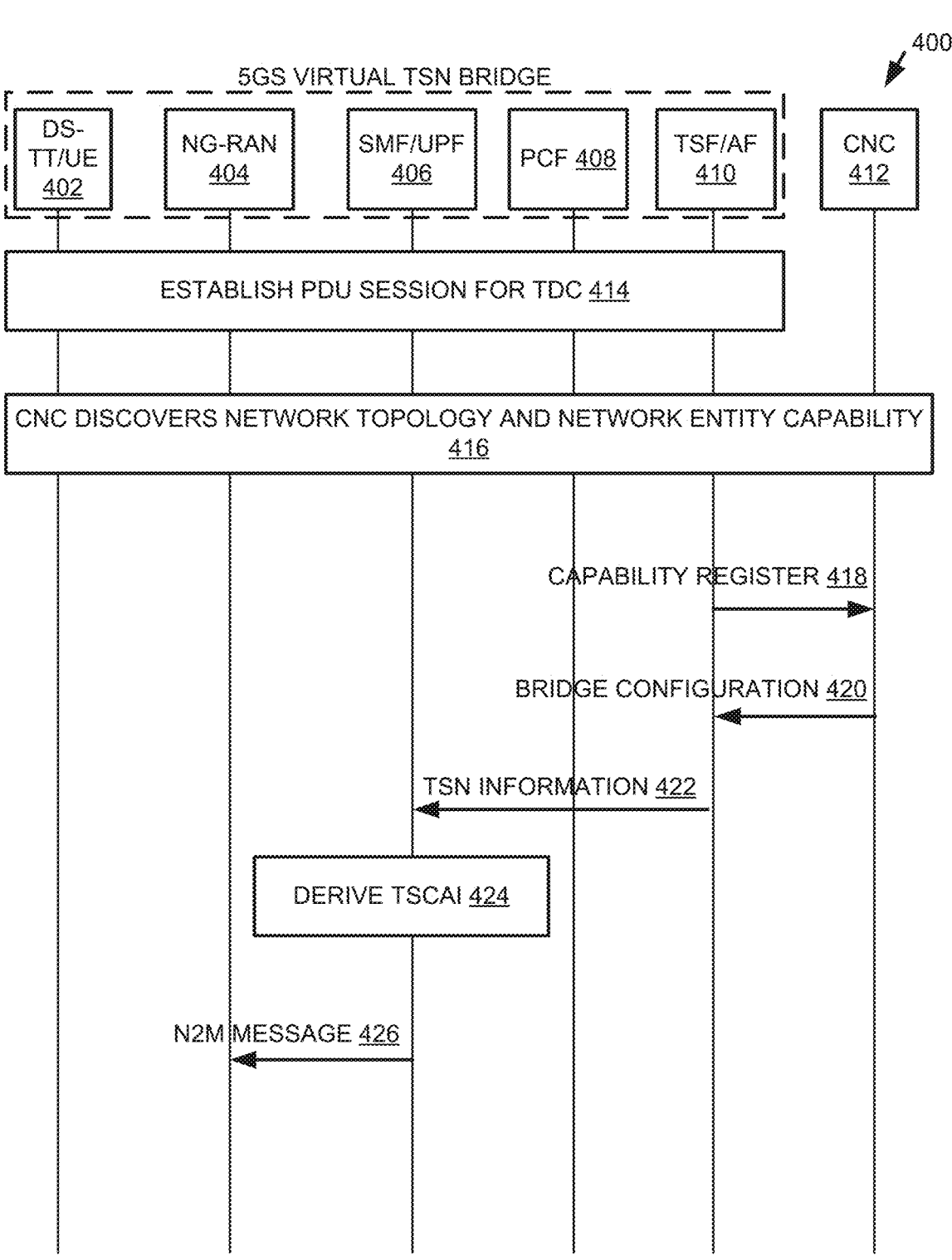
FIG. 4 is an example signaling process for an example TSN configuration procedure.

FIG. 4 is an example signaling process 400 for an example TSN configuration procedure. In step 414, the UE/TT can establish a PDU session for the TSC. The UE can inform the SMF the UE-DS-TT Residence Time. The TSN can calculate the delay per TSN traffic class for this PDU session.

In step 416, the CNC 412 can discover the TSN network topology and network entity capability.

In step 418, the TSN AF 410 can register the 5GS TSN bridge capability to CNC.

In step 420, the CNC 412 can configure the 5GS TSN bridge with TSN stream information.

In step 422, the TSN AF 410 can create the TNS information (e.g., TSN QoS Burst Arrival Time, TSN QoS Periodicity) from the CNC configuration and send it to SMF via PCF.

In step 424, the SMF 406 can derive the TSCAI according to received TSN information.

In step 426, the SMF 406 can send the TSCAI to NG-RAN in the N2 request.

In many deployments (i.e. without TSN), the application may include a Deterministic delay in the 5GS which is similar with what 5GS has done to support TSN.

Figure 5:
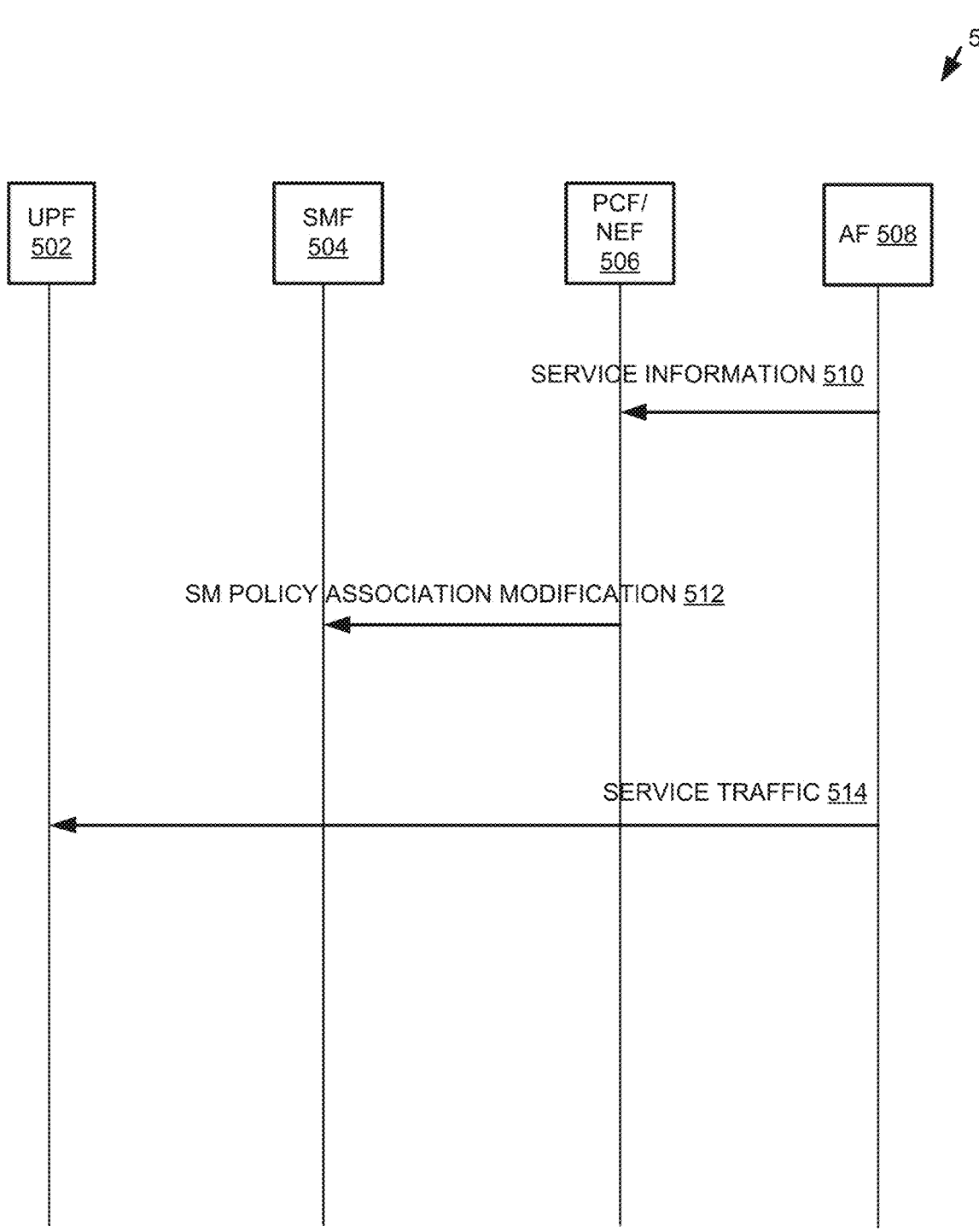
FIG. 5 is a signaling process of an example AF request Policy Authorization procedure.

FIG. 5 is a signaling process 500 of an example AF request Policy Authorization procedure. In step 510, the AF 508 can provide/revoke service information (Deterministic service requirement (e.g., service start time, Periodicity, Delay in the 5G system requirement, etc.) to the PCF, by invoking Npcf_PolicyAuthorization Create Request or Npcf_PolicyAuthorization Update Request service operation. It may be sent via NEF 506.

In step 512, the PCF 506 can initiate SM Policy Association modification to SMF 504 which carry the Deterministic service requirement.

In step 514, the AF 508 can send the traffic packet, which can arrive to the UPF 502 (which will be send to UE via 5G system).

In some instances, the Application may not be able to provide some parameters of Deterministic service requirement as described herein. This can result in a delay in the 5G system, which can be provided by AF.

In some embodiments, during step 510, the AF may not be able to determine the service start time. Even when the AF knows the start time, it may be unable to determine the delay

TABLE 1

| TSC Assistance Information | |
| --- | --- |
| Assistance Information | Description |
| Flow Direction | The direction of the TSC flow (uplink or downlink). |
| Periodicity | It refers to the time period between start of two bursts. |
| Burst Arrival time | The arrival time of the data burst at either the ingress of the RAN (downlink flow direction) or egress interface of the UE (uplink flow direction). |

The Session Management Function SMF can calculates the TASCI using any of: the SMF setting the DL TSCAI Burst Arrival Time as the sum of TSN QoS Burst Arrival between Application Server and UPF, or delay between Device (which is connecting to UE) and UE. This may mean that the SMF cannot know packet arrival time like TSN QoS Burst Arrival Time. The SMF may be unable to calculate the DL TSCAI Burst Arrival Time. For the UL TSCAI Burst Arrival Time, it may be similar. The SMF may not send the TSCAI to NG-RAN.

Periodicity may include an optional parameter. The AF may provide this parameter, also the AF may determine the Periodicity in the step 514 (e.g., when the application server start sending the data). From the above analysis, the SMF may be unable to derive the Burst arrival time of TSCAI because the SMF cannot know the exact time when the packet arrives at the 5G system. In some cases, the SMF may be unable to derive the Periodicity of TSCAI if the AF does not provide these parameters.

The embodiments disclosed in the present document may be used to overcome the above-discussed technical problems, among others.

System Overview

Some disclosed embodiments relate to traffic pattern handling. Particularly, in some embodiments, an SMF can provide an indication to UPF for one more stream, when the UPF receives the packet for these stream, it can calculate the traffic pattern and report to SMF. The SMF can provide an indication to UE/DS-TT for one more streams, when the UE/DS-TT receives the packet for these stream, it can calculate the traffic pattern and report to SMF. The traffic pattern may include any of a burst arrival time, periodicity, traffic direction, and traffic jitter of streams. In some embodiments, the indication can include a monitoring rule received from a PCF.

The SMF can calculate the TSCAI according to received traffic pattern and send it to NG-RAN. The TSCAI may include the Burst arrival time, Periodicity, traffic direction and traffic jitter. The SMF can notify some parameters of traffic pattern to the AF, via PCF/NEF.

Figure 6:
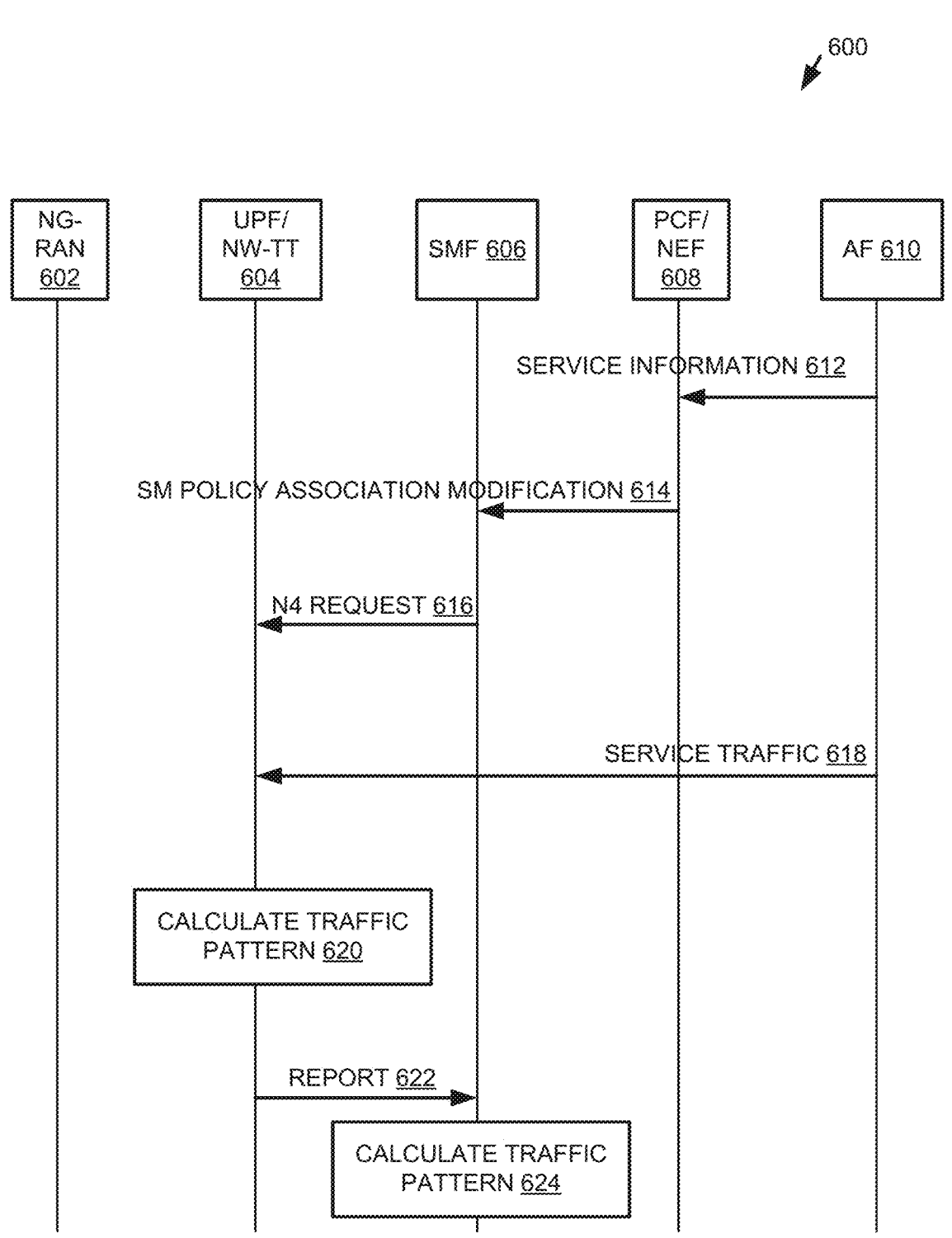
FIG. 6 is a signaling process for an example UPF traffic pattern reporting process.

FIG. 6 is a signaling process 600 for an example UPF traffic pattern reporting process. FIG. 6 can show the SMF indicating the UPF/NW-TT to detect the traffic pattern of stream(s). After calculating the traffic pattern, the UPF report to SMF.

In step 612, the AF 610 can provide/revoke service information (the service start time and Periodicity may not be included) to the PCF, by invoking Npcf_PolicyAuthorization Create Request or Npcf_PolicyAuthorization Update Request service operation. It may be sent via NEF.

In step 614, the PCF 608 can initiate SM Policy Association modification to SMF which carry the service requirement.

In step 616, the SMF 606 can send N4 request to UPF/NW-TT, which can include the indication that the UPF/NW-TT calculate the traffic pattern for stream.

In step 618, the UPF/NW-TT 604 can receive the packet of stream.

In step 620, the UPF/NW-TT 604 can calculate the traffic pattern. The traffic pattern may include, Burst arrival time, Periodicity, traffic direction, and traffic jitter of streams.

In step 622, the UPF/NW-TT 604 can report traffic pattern to SMF 606.

In step 624, the SMF 606 can calculate a traffic pattern using the reported traffic pattern from the UPF/NW-TT 604.

Figure 7:
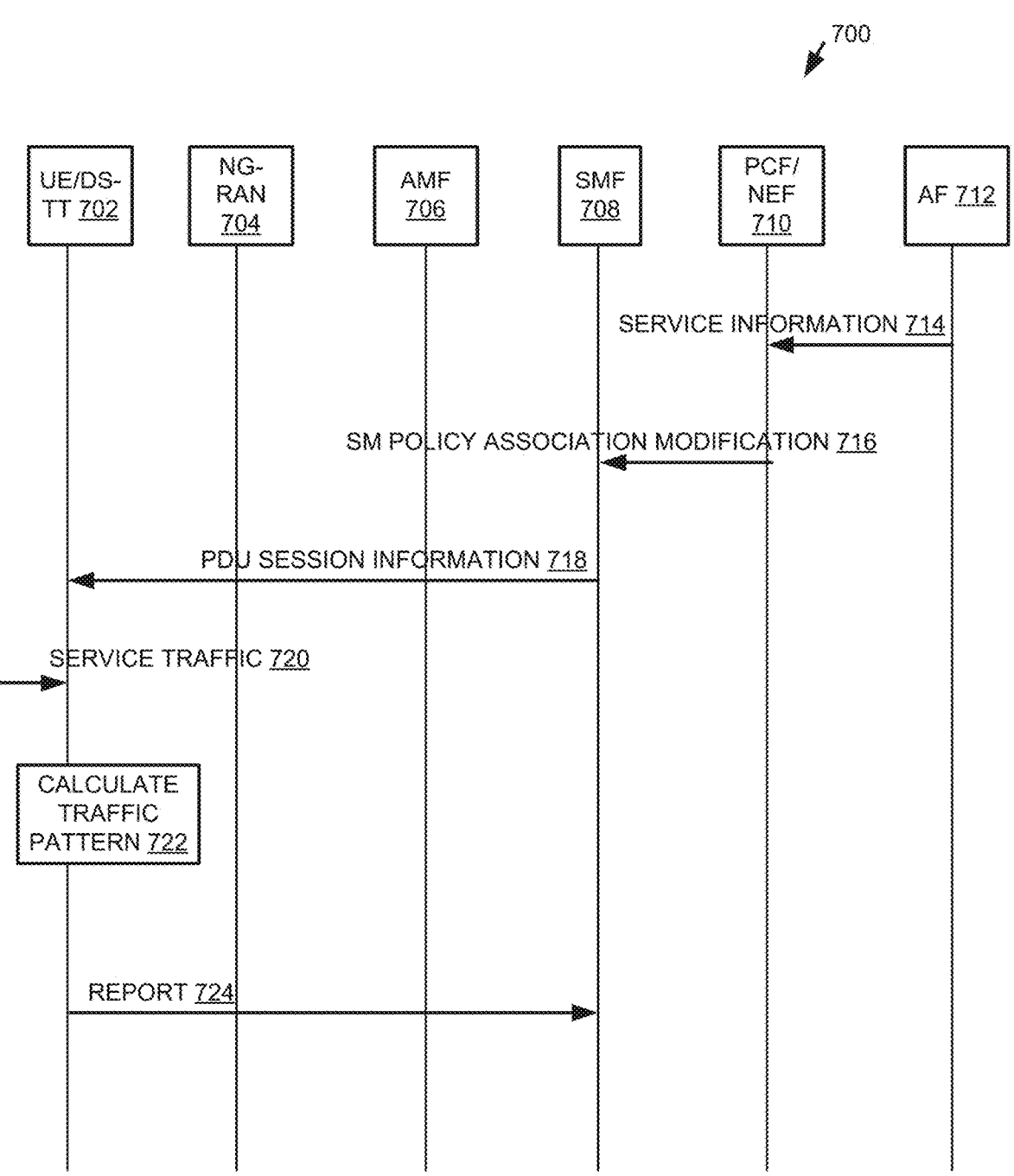
FIG. 7 is a signaling process for an example UE/DS-TT traffic pattern reporting process.

FIG. 7 is a signaling process 700 for an example UE/DS-TT traffic pattern reporting process. FIG. 7 may show the SMF indicate the UE/DS-TT to detect the traffic pattern of stream(s). After calculating the traffic pattern, the UE/DS-TT may report to SMF.

In step 714, the AF 712 can provide/revoke service information (the service start time and Periodicity may not be included) to the PCF, by invoking Npcf_PolicyAuthorization_Create Request or Npcf_PolicyAuthorization_Update Request service operation. It may be sent via NEF.

In step 716, the PCF 710 can initiate SM Policy Association modification to SMF which carry the service requirement.

In step 718, the SMF 708 can initiate the PDU session modification towards UE/DS-TT via AMF and NG-RAN. The SMF may invoke Namf_Communication_N1N2 Message Transfer to AMF which include the N2 SM information, N1 SM container. The AMF can send NG-RAN N2 message which carry N1 SM container. The NG-RAN can send UE/DS-TT the N1 SM message in the RAN specific signaling.

In step 720, the UE/DS-TT 702 can receive the packet of stream.

In step 722, the UE/DS-TT 702 can calculate the traffic pattern. The traffic pattern may include, Burst arrival time, Periodicity, traffic direction and traffic jitter of streams.

In step 724, the UE/DS-TT 702 can report traffic pattern to SMF via NG-RAN and AMF. This can be done via UE initiates PDU session modification.

Figure 8:
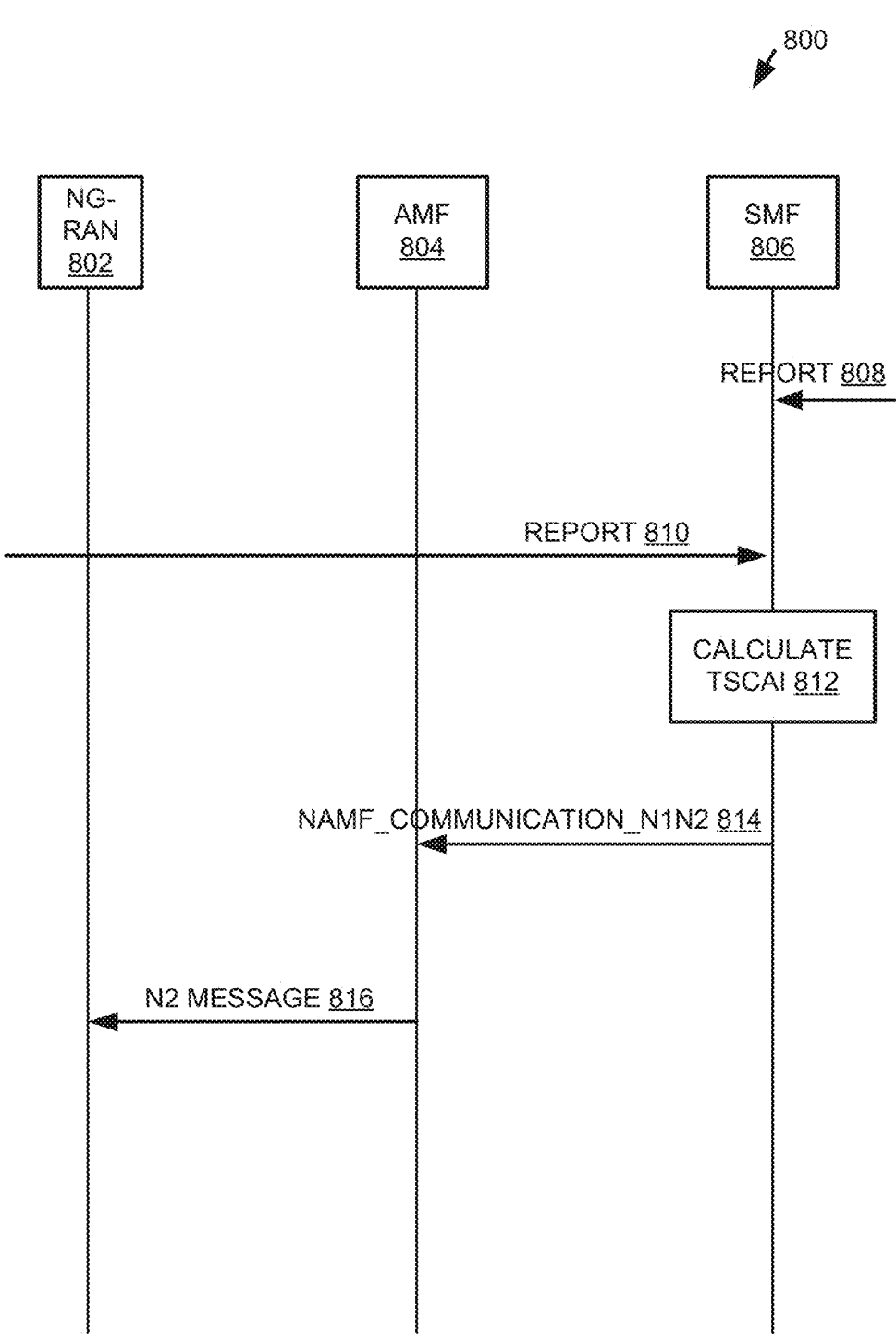
FIG. 8 is a signaling process of an example process for the SMF calculating the TSCAI according to the traffic pattern.

FIG. 8 is a signaling process 800 of an example process for the SMF calculating the TSCAI according to the traffic pattern. FIG. 8 can illustrate the SMF calculating the TSCAI according to the received traffic pattern and send TSCAI to NG-RAN.

In steps 808, 810, the SMF 806 can receive the traffic pattern from UE/DS-TT or UPF/NW-TT. Alternatively, SMF can receive the arrival time and/or jitter of packet from UPF/NW-TT and calculate the traffic pattern. The traffic pattern may include, Burst arrival time, Periodicity, traffic direction and traffic jitter of streams.

In step 812, the SMF 806 can calculate the TSCAI according to the traffic pattern. The TSCAI may include the Burst arrival time, Periodicity, traffic direction and traffic jitter.

In steps 814, 816, the SMF 806 can send TSCAI to NG-RAN 802 via AMF 804.

Figure 9:
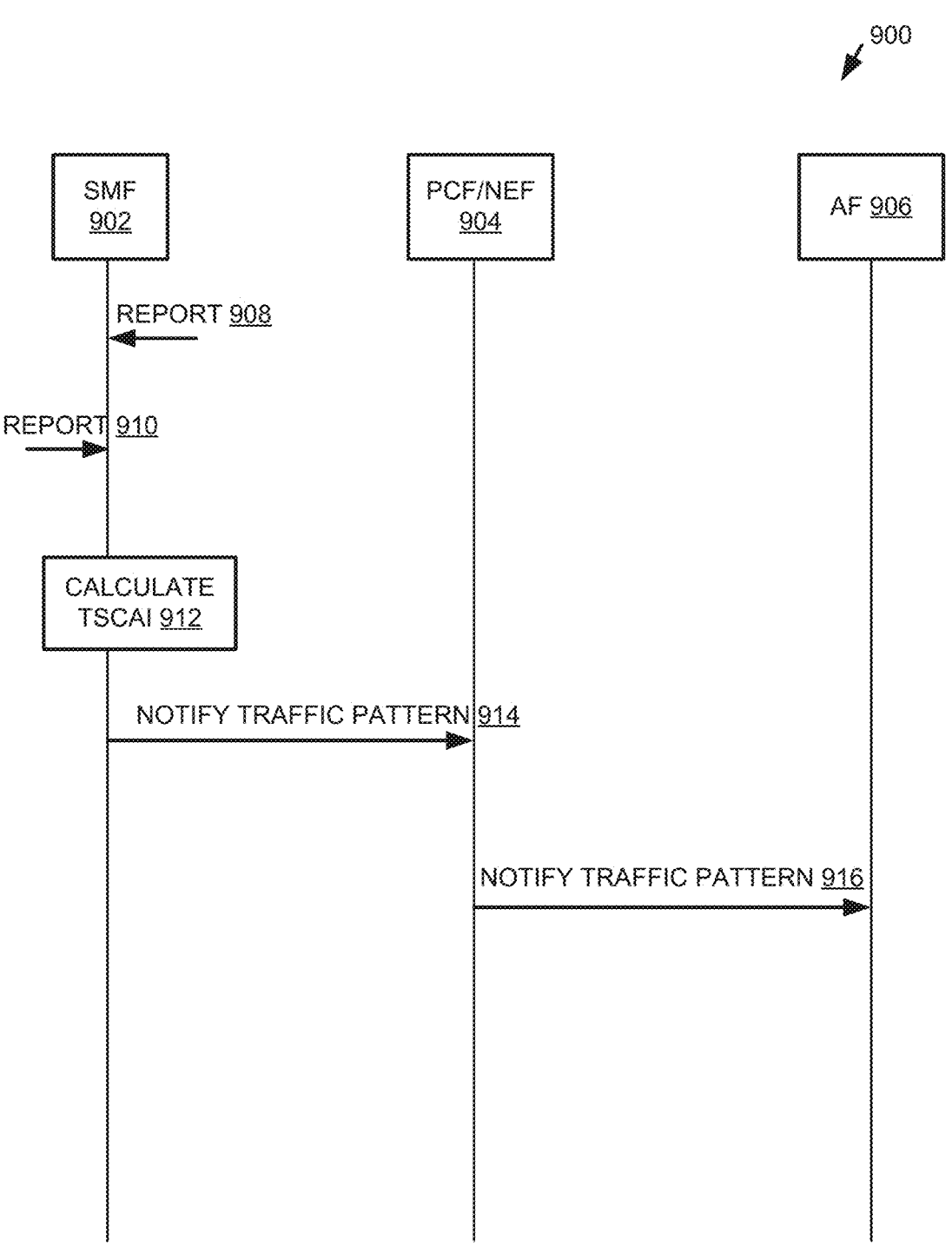
FIG. 9 is a signaling process illustrating a process for the SMF notifying the traffic pattern to the AF.

FIG. 9 is a signaling process 900 illustrating a process for the SMF notifying the traffic pattern to the AF. FIG. 9 shows how the SMF calculates the TSCAI according to the traffic pattern and send parameters of traffic pattern to AF.

In step 908 and 910, the SMF 902 can receive the traffic pattern from UE/DS-TT or UPF/NW-TT. Alternatively, SMF can receive the arrival time and/or jitter of packet from UPF/NW-TT and calculate the traffic pattern. The traffic pattern may include, Burst arrival time, Periodicity, traffic direction and traffic jitter of streams.

In step 912, the SMF 902 can calculate the TSCAI according to the traffic pattern In steps 914 or 916, the SMF 902 can notify some parameters of traffic pattern to AF 906 via PCF/NEF 904.

An SMF can provide an indication to a UPF for one or more streams. The UPF can receive the packet for those streams and calculate a traffic pattern. The calculated traffic pattern can be reported to the SMF.

The SMF can provide an indication to a UE/DS-TT for one or more streams. The UE/DS-TT can receive the packet for the stream, calculate the traffic pattern, and report the traffic pattern to SMF.

The traffic pattern may include any of a burst arrival time, a periodicity, a traffic direction, and a traffic jitter of the one or more streams.

SMF calculate the TSCAI according to received traffic pattern and send it to NG-RAN SMF notify some parameters of traffic pattern to the AF, via PCF/NEF.

Figure 10:
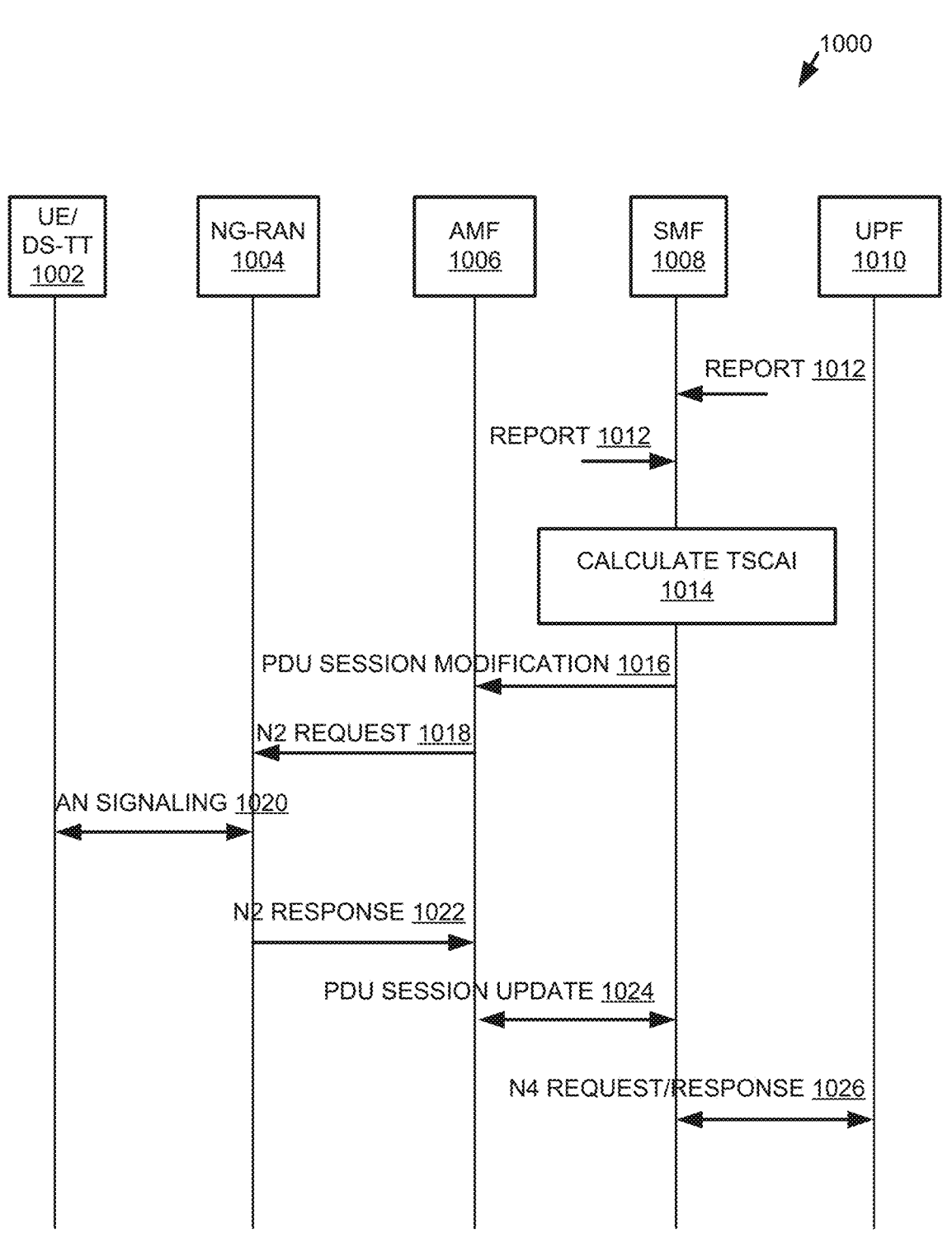
FIG. 10 is a signaling process for establishing a new QoS Flow after the TSCAI calculation.

FIG. 10 is a signaling process 1000 for establishing a new QoS Flow after the TSCAI calculation. The stream can be carried on the new Qos flow. In step 1012, The SMF 1008 can receive the traffic pattern from UE/DS-TT 1002 or UPF/NW-TT. Alternatively, the SMF 1008 can receive the arrival time and/or jitter of packet from UPF/NW-TT and calculate the traffic pattern. The traffic pattern may include, Burst arrival time, Periodicity, traffic direction and traffic jitter of streams.

In step 1014, the SMF 1008 can calculate the TSCAI according to the traffic pattern In step 1016, the SMF 1008 can determine a new QoS flow is required to carry the stream(s). SMF initiate the PDU session modification. The SMF may invoke Namf_Communication_N1N2 Message Transfer to AMF which include the N2 SM information, N1 SM container.

In step 1018, the AMF 1006 can send NG-RAN N2 message which carry N1 SM container.

In step 1020, the NG-RAN 1004 can send UE/DS-TT the N1 SM message in the RAN specific signaling. The UE/DS-TT acknowledge the received message.

In step 1022, the NG-RAN 1004 can send the N2 response to AMF.

In step 1024, the AMF 1005 can send the PDU session update to inform the SMF the N2 response.

In step 1026, the SMF 1008 can send the N4 request to inform the UPF the added QoS flow information.

Figure 11:
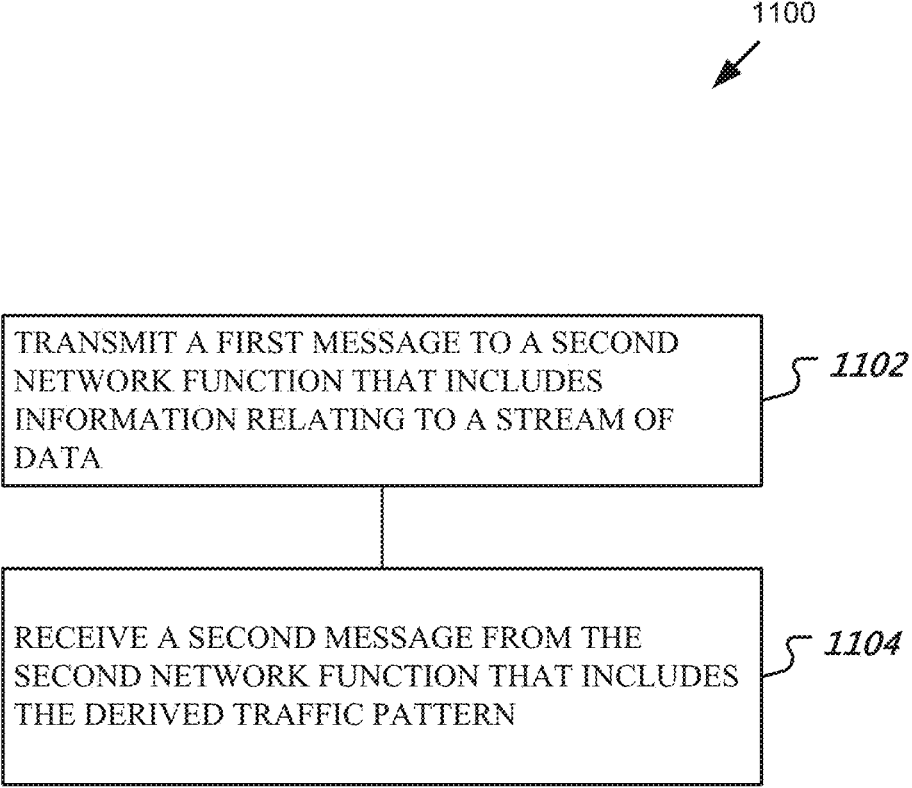
FIG. 11 is a block diagram of an example method for traffic pattern handling.

FIG. 11 is a block diagram 1100 of an example method for traffic pattern handling. The method can include transmitting, by a first network function, a first message to a second network function that includes information relating to a stream of data (block 1102). The second network function can be configured to derive a traffic pattern based on the information relating to the stream of data included in the first message. The first network function can include a SMF as described in FIGS. 6-10, for example. The second network function can include a UPF and/or a UE as described in FIGS. 6-10, for example.

The method can also include receiving, by the first network function, a second message from the second network function that includes the derived traffic pattern (block 1104).

In some embodiments, the first network function comprises a session management function (SMF).

In some embodiments, the second network function comprises a user plane function (UPF).

In some embodiments, the method includes receiving, by the first network function, a session management policy association modification message that includes a monitoring rule from a policy control function configured to receive service information from an application function.

In some embodiments, the method includes calculating, by the first network function, time sensitive network (TSN) communication (TSC) assistance information (TSCAI) based on the derived traffic pattern received in the second message; and forwarding, by the first network function, the calculated TSCAI to a radio access node.

In some embodiments, the method includes transmitting, by the first network function, traffic pattern information from the derived traffic pattern to the policy control function, wherein the policy control function is configured to forward the derived traffic pattern to the application function, and wherein the traffic pattern information includes any of a burst arrival time, a periodicity, and a traffic jitter.

In some embodiments, the method includes sending, by the first network function, a monitoring rule for one or more data streams to the second network function, wherein the second network function is configured to report an arrival time of the packet to the first network function, wherein the first network function calculates the traffic pattern from the reported arrival time.

In some embodiments, the TSCAI includes any of a burst arrival time, a periodicity, a traffic direction, and a traffic jitter.

In some embodiments, the method includes establishing, by the first network function, a new quality of service (QoS) flow according to the calculated TSCAI.

In another embodiment, a method for data communication can include receiving, by a user plane function, a first message from a session management function that includes information relating to a stream of data. The method can also include calculating, by the user plane function, a traffic pattern based on the information relating to the stream of data included in the first message. The method can also include transmitting, by the user plane function, a second message to the session management function that includes the calculated traffic pattern.

In some embodiments, the calculated traffic pattern includes a burst arrival time of the stream of data.

In some embodiments, the calculated traffic pattern includes a periodicity of the stream of data.

In some embodiments, the calculated traffic pattern includes a traffic direction of the stream of data.

In some embodiments, the calculated traffic pattern includes a traffic jitter of the stream of data.

In another embodiment, a method of data communication comprises receiving, by a terminal, a first message from a first network function that includes information relating to a stream of data. The method can also include calculating, by the terminal, a traffic pattern based on the information relating to the stream of data included in the first message. The method can also include transmitting, by the terminal, a second message to the first network function that includes the calculated traffic pattern.

In some embodiments, the first network function comprises a session management function (SMF).

In some embodiments, the first message comprises a protocol data unit (PDU) session information message.

In some embodiments, the calculated traffic pattern includes any of a burst arrival time of the stream of data, a periodicity of the stream of data, a traffic direction of the stream of data, and a traffic jitter of the stream of data.

Example Wireless System

Figure 12:
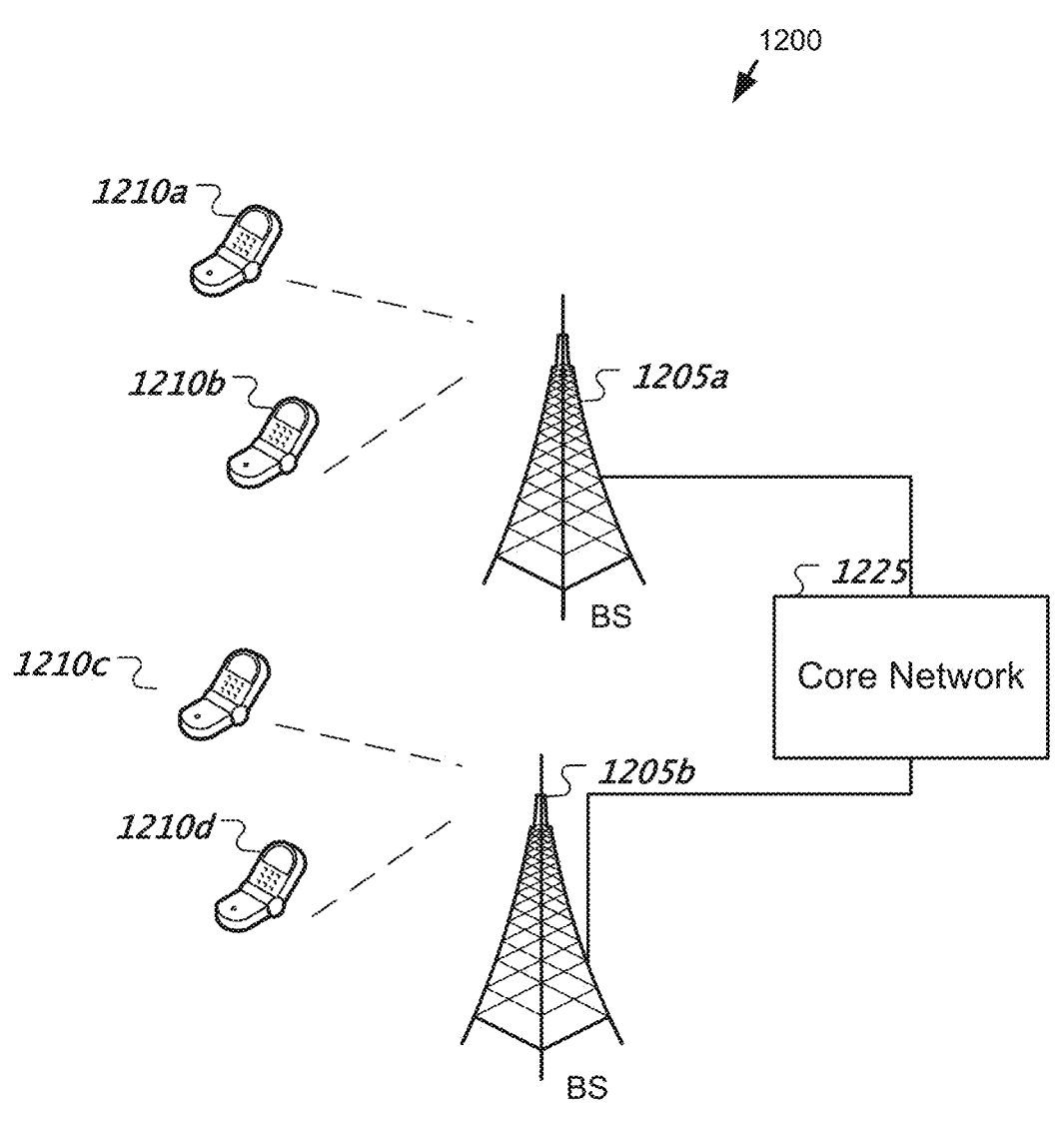
FIG. 12 shows an example of a wireless communication system where techniques in accordance with one or more embodiments of the present technology can be applied.

FIG. 12 shows an example of a wireless communication system where techniques in accordance with one or more embodiments of the present technology can be applied. A wireless communication system 1200 can include one or more base stations (BSs) 1205a, 1205b, one or more wireless devices or terminals 1210a, 1210b, 1210c, 1210d, and a core network 1225. A base station 1205a, 1205b can provide wireless service to wireless devices 1210a, 1210b, 1210c and 1210d in one or more wireless sectors. In some implementations, a base station 1205a, 1205b includes directional antennas to produce two or more directional beams to provide wireless coverage in different sectors. The base station may implement functionalities of a scheduling cell or a candidate cell, as described in the present document.

The core network 1225 can communicate with one or more base stations 1205*a*, 1205*b*. The core network 1225 provides connectivity with other wireless communication systems and wired communication systems. The core network may include one or more service subscription databases to store information related to the subscribed wireless devices 1210*a*, 1210*b*, 1210*c*, and 1210*d*. A first base station 1205*a* can provide wireless service based on a first radio access technology, whereas a second base station 1205*b* can provide wireless service based on a second radio access technology. The base stations 1205*a* and 1205*b* may be co-located or may be separately installed in the field according to the deployment scenario. The wireless devices 1210*a*, 1210*b*, 1210*c*, and 1210*d* can support multiple different radio access technologies.

In some implementations, a wireless communication system can include multiple networks using different wireless technologies. A dual-mode or multi-mode wireless device includes two or more wireless technologies that could be used to connect to different wireless networks.

Figure 13:
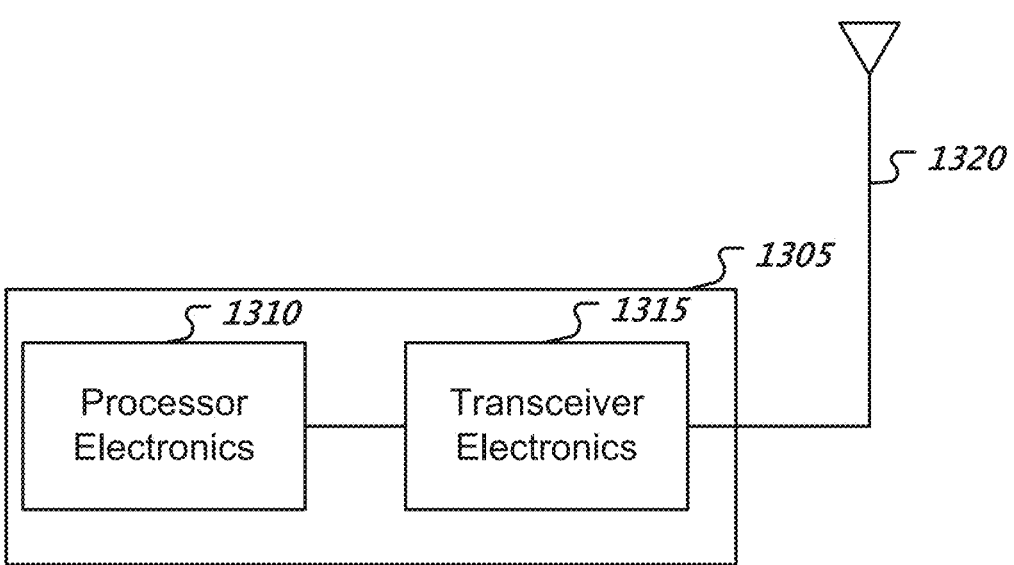
FIG. 13 is a block diagram representation of a portion of a hardware platform.

FIG. 13 is a block diagram representation of a portion of a hardware platform. A hardware platform 1305 such as a network node or a base station or a terminal or a wireless device (or UE) can include processor electronics 1310 such as a microprocessor that implements one or more of the techniques presented in this document. The hardware platform 1305 can include transceiver electronics 1315 to send and/or receive wired or wireless signals over one or more communication interfaces such as antenna 1320 or a wireline interface. The hardware platform 1305 can implement other communication interfaces with defined protocols for transmitting and receiving data. The hardware platform 1305 can include one or more memories (not explicitly shown) configured to store information such as data and/or instructions. In some implementations, the processor electronics 1310 can include at least a portion of the transceiver electronics 1315. In some embodiments, at least some of the disclosed techniques, modules or functions are implemented using the hardware platform 1305.

Conclusion

The present embodiments relate to derivation of a traffic pattern. A second network function (e.g., a UPF) can derive a traffic pattern based on information relating to a data stream provided by a first network function (e.g., a SMF). The second network function can report the traffic pattern to the first network function.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A method for data communication, comprising:
transmitting, by a session management function (SMF), an N4 request to a user plane function (UPF) that includes an indication for the UPF to calculate a traffic pattern that includes at least one of a burst arrival time, a periodicity, or a traffic jitter relating to a stream of data, wherein the UPF is configured to calculate the traffic pattern based on the N4 request;
receiving, by the SMF, a report from the UPF that includes the calculated traffic pattern;
calculating, by the SMF, time sensitive network (TSN) communication (TSC) assistance information (TSCAI) based on the calculated traffic pattern received in the report; and
forwarding, by the SMF, the calculated TSCAI to a radio access node.

2. The method of claim 1, further comprising:
transmitting, by the SMF, traffic pattern information from the calculated traffic pattern to a policy control function, wherein the policy control function is configured to forward the traffic pattern information to an application function, and wherein the traffic pattern information includes at least one of the burst arrival time, the periodicity, or the traffic jitter.

3. The method of claim 1, further comprising:
receiving, by the SMF, a second report of an arrival time of a packet from the UPF; and
calculating, by the SMF, a second traffic pattern from the reported arrival time.

4. The method of claim 1, further comprising:
establishing, by the SMF, a new quality of service (QoS) flow according to the calculated TSCAI.

5. A method for data communication, comprising:
receiving, by a user plane function, an N4 request from a session management function that includes an indication for the user plane function to calculate a traffic pattern that includes at least one of a burst arrival time, a periodicity, and or a traffic jitter relating to a stream of data;
calculating, by the user plane function, the traffic pattern based on the N4 request; and
transmitting, by the user plane function, a report to the session management function that includes the calculated traffic pattern.

6. The method of claim 5, wherein the calculated traffic pattern includes the burst arrival time of the stream of data.

7. The method of claim 5, wherein the calculated traffic pattern includes the periodicity of the stream of data.

8. The method of claim 5, wherein the calculated traffic pattern includes a traffic direction of the stream of data.

9. The method of claim 5, wherein the calculated traffic pattern includes the traffic jitter of the stream of data.

10. An apparatus for wireless communication, comprising processor electronics configured to implement a method, the processor electronics configured to cause the apparatus to:
transmit, by a session management function (SMF), an N4 request to a user plane function (UPF) that includes an indication for the UPF to calculate a traffic pattern that includes at least one of a burst arrival time, a periodicity, or a traffic jitter relating to a stream of data, wherein the UPF is configured to calculate the traffic pattern based on the N4 request;
receive, by the SMF, a report from the UPF that includes the calculated traffic pattern;
calculate, by the SMF, time sensitive network (TSN) communication (TSC) assistance information (TSCAI) based on the calculated traffic pattern received in the report; and
forward, by the SMF, the calculated TSCAI to a radio access node.

11. The apparatus of claim 10, wherein the processor is further configured to:
transmit, by the SMF, traffic pattern information from the calculated traffic pattern to a policy control function, wherein the policy control function is configured to forward the traffic pattern information to an application function, and wherein the traffic pattern information includes at least one of the burst arrival time, the periodicity, or the traffic jitter.

12. The apparatus of claim 10, wherein the processor electronics is further configured to:
receive, by the SMF, a second report of an arrival time of a packet from the UPF; and
calculate, by the SMF, a second traffic pattern from the reported arrival time.

13. The apparatus of claim 10, wherein the processor electronics is further configured to:
establish, by the SMF, a new quality of service (QoS) flow according to the calculated TSCAI.

14. An apparatus for wireless communication, comprising processor electronics configured to cause the apparatus to:
receive, by a user plane function, an N4 request from a session management function that includes an indication for the user plane function to calculate a traffic pattern that includes at least one of a burst arrival time, a periodicity, and or a traffic jitter relating to a stream of data;
calculate, by the user plane function, the traffic pattern based on the N4 request; and
transmit, by the user plane function, a report to the session management function that includes the calculated traffic pattern.

15. The apparatus of claim 14, wherein the calculated traffic pattern includes the burst arrival time of the stream of data.

16. The apparatus of claim 14, wherein the calculated traffic pattern includes the periodicity of the stream of data.

17. The apparatus of claim 14, wherein the calculated traffic pattern includes a traffic direction of the stream of data.

18. The apparatus of claim 14, wherein the calculated traffic pattern includes the traffic jitter of the stream of data.

* * * * *